Aug. 9, 1966   H. R. JENNINGS ETAL   3,265,945
PACKAGED CAPACITOR AND METHOD OF MAKING THE SAME
Filed Oct. 27, 1964

INVENTORS
HOWARD R. JENNINGS
BY LIVINGSTON L. RICE
Connolly and Hutz
THEIR ATTORNEYS 3,265,945
PACKAGED CAPACITOR AND METHOD OF
MAKING THE SAME
Howard R. Jennings, Berkshire, and Livingston L. Rice, Williamstown, Mass., assignors to Sprague Electric Company, North Adams, Mass., a corporation of Massachusetts
Filed Oct. 27, 1964, Ser. No. 406,823
2 Claims. (Cl. 317—258)

The present invention is concerned with packaged components and more particularly with a packaged, oil-impregnated capacitor.

In the industry there is a class of components known as "Industrial Oil Capacitors." Included in this class is a unit comprising one or more rolled capacitor sections, impregnated with an oleaginous halogenated organic compound and sealed in a suitable container.

A need exists for a capacitor of this type packaged in an inexpensive, flexible, form-fitting, liquid tight, durable dielectric envelope.

It is an object of the present invention to present such a packaged capacitor.

Additional objects and advantages will become apparent from the following description considered together with the appended drawings wherein.

Figures 1, 2:
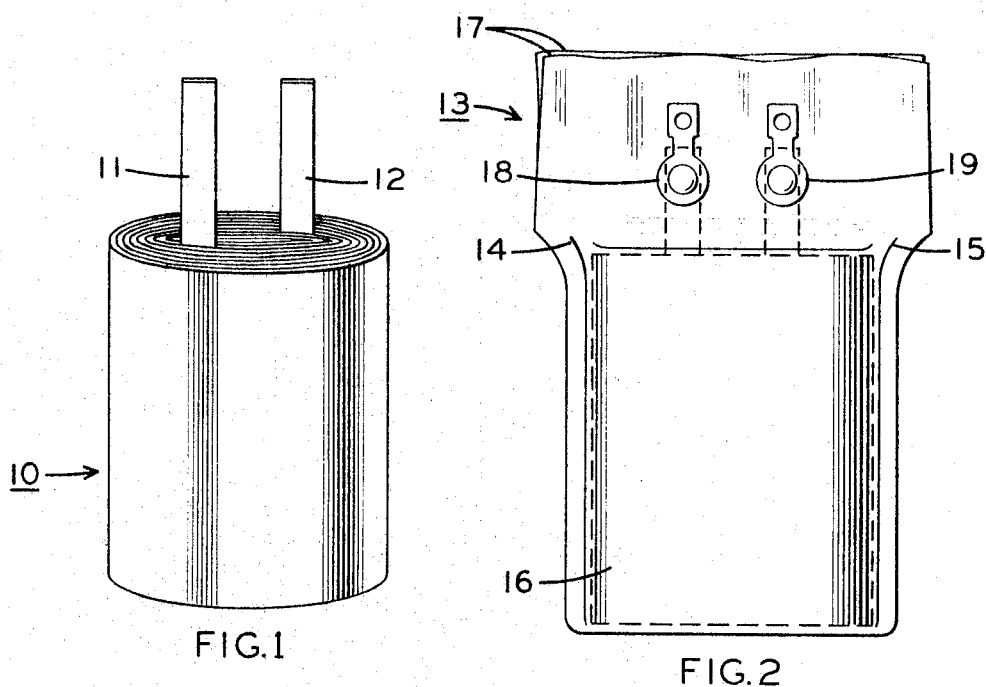
FIGURE 1 is a perspective view of a capacitor of the type packaged according to the present invention.
FIGURE 2 is a side view of the capacitor in the partially shrunken and partially sealed container.
Figures 3, 4:
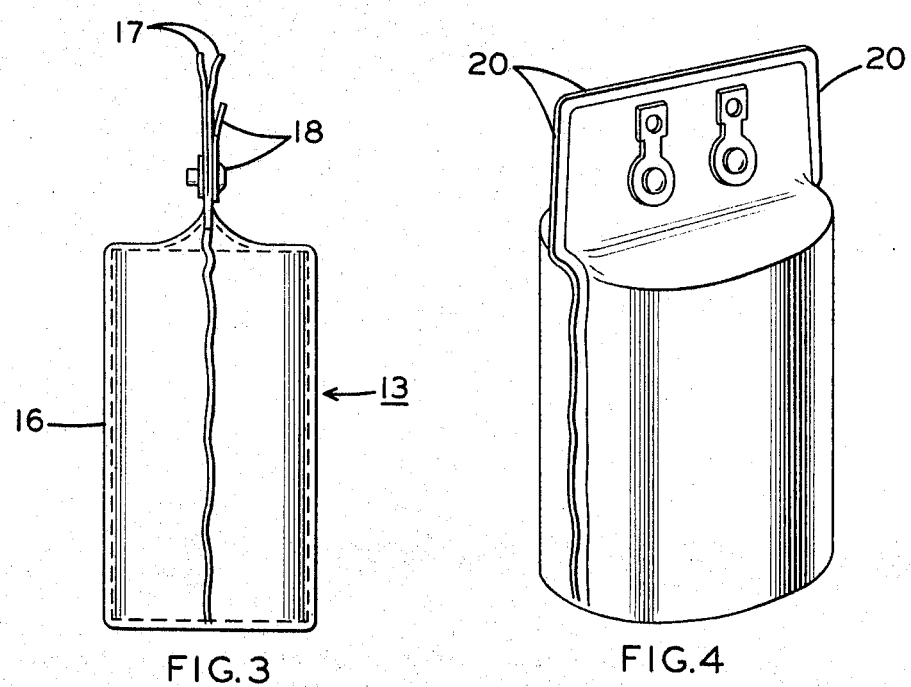
FIGURE 3 is an end view of the unit of FIGURE 2.
FIGURE 4 is a perspective view of the completed package.

Referring to the drawing, a rolled foil capacitor 10 has electrode tabs 11 and 12 extending therefrom. Capacitor 10 is positioned within a dielectric polyvinylfluoride envelope 13. Envelope 13 is formed from a single sheet of film folded in two and heat sealed part way up two of its sides stopping about half way, near points 14 and 15. The capacitor-surrounding portion 16 of the envelope is heat-shrunken to conform tightly to the shape of the capacitor. The two flap portions 17 of the envelope are not heat-shrunken. Electrode tabs 11 and 12 are terminated through flap portions 17 to contacts 18 and 19 located outside of the envelope. FIGURE 4 shows the completed unit which has been heat-sealed about the remainder of the envelope, shown at 20, after impregnating the unit with an oily chlorinated dielectric. The final heat-seal is effected while the unit and point of seal is submerged in said dielectric or the point of seal is at least coated with said dielectric.

Polyvinylfluoride film, the homopolymer of vinyl fluoride, is a material exhibiting all the characteristics necessary for a package of the type contemplated herein, including the property of heat sealability in the presence of an oily dielectric. By "in the presence of" means while submerged in or coated with the oily dielectric. The PVF film of the present invention is commercially available or can be prepared according to procedures described in U.S. Patents Nos. 2,419,008 and 2,419,010 to Coffman and Ford. The film thickness may range from about ½ to about 2 mils.

It was completely unexpected that the polyvinylfluoride film could be heat-sealed in the presence of the oily dielectric. The dielectric was expected to act as a contaminating antiseal, if not completely removed from the seal area. It was found, however, that the film readily sealed to itself even when the sealing step was performed while the seal area was submerged in the oily liquid dielectric.

It is absolutely essential that all air be excluded from the capacitors of the present invention. Should a small air pocket be permitted to remain in the unit, a chemical reaction will take place between the constituents of air and the organic dielectric. The products of this reaction lead directly to the breakdown of the units.

The packaged units are formed in the following manner: a convolutely wound foil capacitor section having electrode tabs extending therefrom is positioned within a polyvinylfluoride envelope. As previously stated the envelope may be formed from a single sheet of film folded in two and heat-sealed part way up two of its sides stopping about half way. Approximately the lower half of the envelope is heat-shrunken to conform tightly to the shape of the capacitor section. The heat is applied in any convenient manner. The electrode tabs are then terminated through the flap portions to external contacts. The sides of the envelope are then heat-sealed the rest of the way to the top of the envelope. Only the top now remains unsealed. The unit is submerged in a chlorinated organic dielectric, e.g. Clorinol, and all air is expelled from the unit and replaced with said dielectric. While the unit is brimful of the dielectric, a heat-sealing mechanism seals the envelope across its top. This mechanism may conveniently be a clamping impulse heat-sealer comprising two clamping resistance bars. The unit may also be sealed while completely submerged in the dielectric. Thereafter, the completed package is cleaned of dielectric on the outside surfaces thereof.

The polyvinylfluoride film of the present invention need not be heat-sealable on both surfaces. One surface may be treated to render it adherable for use with adhesives, inks, and coatings. A suitable treatment comprises exposing the surface to a mixture of boron trifluoride and oxygen. This will render the exposed surface adherable and nonheat-sealable.

As many apparently widely different embodiments of this invention may be made without departing from the spirit and scope hereof, it is to be understood that the invention is not limited to its specific embodiments except as defined in the appended claims.

What is claimed is:

1. The process of forming a packaged capacitor comprising positioning a convolutely wound foil capacitor section within a dielectric polyvinylfluoride film envelope, impregnating said section and filling said envelope to the exclusion of all air with an oleaginous, halogenated organic dielectric liquid and heat-sealing said envelope while the seal area is covered with said dielectric liquid.

2. A halogenated oil-filled capacitor comprising a capacitance section having electrode tabs extending therefrom, said section and tabs being enveloped by a dielectric polyvinylfluoride film envelope, said film envelope conforming generally to the shape of said section; a halogenated oil completely filling the envelope, said envelope having been heat-sealed while the heat-seal area was covered with said halogenated oil; and said electrode tabs being terminated to contacts located on the outside of said envelope.

References Cited by the Examiner

UNITED STATES PATENTS

| | | | |
|---|---|---|---|
| 1,811,067 | 6/1931 | Valle | 317—260 |
| 2,142,505 | 1/1939 | Gammeter. | |
| 2,535,517 | 12/1950 | Rhodes | 317—260 |
| 2,669,351 | 2/1954 | Carson | 206—46 |
| 2,815,896 | 12/1957 | Shapero | 206—46 X |
| 2,856,449 | 10/1958 | Coler | 174—50.46 |

LARAMIE E. ASKIN, *Primary Examiner.*

ROBERT K. SCHAEFER, *Examiner.*

E. GOLDBERG, *Assistant Examiner.*